United States Patent
Flannery et al.

(10) Patent No.: US 9,967,534 B1
(45) Date of Patent: May 8, 2018

(54) DIGITAL VIDEO RECORDER VIDEO EDITING SYSTEM

(75) Inventors: Matthew Flannery, Portola Valley, CA (US); Margret Schmidt, Redwood City, CA (US); David Pope, Los Altos, CA (US)

(73) Assignee: TiVo Solutions Inc., San Jose, CA (US)

( * ) Notice: Subject to any disclaimer, the term of this patent is extended or adjusted under 35 U.S.C. 154(b) by 851 days.

(21) Appl. No.: 11/285,402

(22) Filed: Nov. 21, 2005

Related U.S. Application Data

(60) Provisional application No. 60/630,398, filed on Nov. 19, 2004.

(51) Int. Cl.
| | |
|---|---|
| *H04N 9/804* | (2006.01) |
| *H04N 5/85* | (2006.01) |
| *H04N 1/21* | (2006.01) |
| *H04N 5/95* | (2006.01) |
| *H04N 9/83* | (2006.01) |

(52) U.S. Cl.
CPC ......... *H04N 9/8042* (2013.01); *H04N 1/2112* (2013.01); *H04N 5/85* (2013.01); *H04N 5/95* (2013.01); *H04N 9/83* (2013.01)

(58) Field of Classification Search
CPC ...... H04N 9/8042; H04N 5/85; H04N 1/2112; H04N 5/95; H04N 9/83
USPC ....... 386/1, 46, 52–55, 68, 83, 95, 124–126; 715/720–721; 725/19–20, 39, 43–45, 89
See application file for complete search history.

(56) References Cited

U.S. PATENT DOCUMENTS

| | | | |
|---|---|---|---|
| 2,865,990 | A | 12/1958 | Towler |
| 3,682,363 | A | 8/1972 | Hull |
| 3,942,190 | A | 3/1976 | Detweiler |
| 4,141,039 | A | 2/1979 | Yamamoto |
| 4,221,176 | A | 9/1980 | Besore |
| 4,224,481 | A | 9/1980 | Russell |
| 4,233,628 | A | 11/1980 | Ciciora |

(Continued)

FOREIGN PATENT DOCUMENTS

| | | |
|---|---|---|
| CA | 2 137 745 | 12/1994 |
| CN | 1189045 | 7/1998 |

(Continued)

OTHER PUBLICATIONS

U.S. Appl. No. 10/081,776, filed Feb. 20, 2002, dated Nov. 3, 2006.

(Continued)

*Primary Examiner* — Tat C Chio
(74) *Attorney, Agent, or Firm* — Haley Guiliano LLP

(57) ABSTRACT

A method and apparatus for a digital video recorder (DVR) video editing system provides a user interface and video editing environment for content stored on a DVR's storage device. A visual progress indicator is displayed over the program content that the user has selected to edit. The user moves a position indicator within a cache bar in the visual progress indicator that indicates how much of the program content has been stored on the storage device. The user can delete sections of the program content. The user can also add other recorded program content into the program content. The deleted sections and added content are highlighted in the cache bar by colors that are different from the normal color used for the cache bar.

21 Claims, 13 Drawing Sheets

(56) References Cited

U.S. PATENT DOCUMENTS

| | | |
|---|---|---|
| 4,258,418 A | 3/1981 | Heath |
| 4,306,250 A | 12/1981 | Summers et al. |
| 4,313,135 A | 1/1982 | Cooper |
| 4,347,527 A | 8/1982 | Lainez |
| 4,388,659 A | 6/1983 | Lemke |
| 4,408,309 A | 10/1983 | Kiesling et al. |
| 4,423,480 A | 12/1983 | Bauer et al. |
| 4,439,785 A | 3/1984 | Leonard |
| 4,506,348 A | 3/1985 | Miller et al. |
| 4,506,358 A | 3/1985 | Montgomery |
| 4,566,034 A | 1/1986 | Harger et al. |
| 4,602,297 A | 7/1986 | Resse |
| 4,633,331 A | 12/1986 | McGrady et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,755,889 A | 7/1988 | Schwartz |
| 4,760,442 A | 7/1988 | O'Connell et al. |
| 4,761,684 A | 8/1988 | Clark et al. |
| 4,752,834 A | 9/1988 | Koombes |
| 4,789,961 A | 12/1988 | Tindall |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,891,715 A | 1/1990 | Levy |
| 4,920,533 A | 4/1990 | Dufresne et al. |
| 4,924,387 A | 5/1990 | Jeppesen |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,897,867 A | 9/1990 | Foster et al. |
| 4,963,866 A | 10/1990 | Duncan |
| 4,963,995 A | 10/1990 | Lang |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,027,400 A | 6/1991 | Baji et al. |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Koberi et al. |
| 5,118,105 A | 6/1992 | Brim et al. |
| 5,121,476 A | 6/1992 | Yee |
| 5,124,854 A | 6/1992 | Iyota et al. |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,142,532 A | 8/1992 | Adams |
| 5,153,726 A | 10/1992 | Billing |
| 5,155,663 A | 10/1992 | Harase |
| 5,168,353 A | 12/1992 | Walker et al. |
| 5,172,413 A | 12/1992 | Bradley et al. |
| 5,202,761 A | 4/1993 | Cooper |
| 5,208,665 A | 5/1993 | McCalley et al. |
| 5,214,768 A | 5/1993 | Martin et al. |
| 5,222,150 A | 6/1993 | Tajima |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Tekeuchi |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,283,659 A | 2/1994 | Akiyama et al. |
| 5,285,272 A | 2/1994 | Bradley et al. |
| 5,287,182 A | 2/1994 | Haskell et al. |
| 5,311,423 A | 5/1994 | Clark |
| 5,317,556 A | 5/1994 | Tsuboi et al. |
| 5,317,603 A | 5/1994 | Osterweil |
| 5,317,604 A | 5/1994 | Osterweil |
| 5,329,307 A | 7/1994 | Takemura |
| 5,329,320 A | 7/1994 | Yifrach |
| 5,357,276 A | 10/1994 | Banker et al. |
| 5,361,261 A | 11/1994 | Edem et al. |
| 5,363,362 A | 11/1994 | Maeda et al. |
| 5,371,551 A | 12/1994 | Logan et al. |
| 5,377,051 A | 12/1994 | Lane et al. |
| 5,388,264 A | 2/1995 | Tobias, II et al. |
| 5,406,626 A | 4/1995 | Ryan |
| 5,412,416 A | 5/1995 | Nemirofsky |
| 5,414,455 A | 5/1995 | Hooper et al. |
| 5,428,731 A | 6/1995 | Powers |
| 5,438,423 A | 8/1995 | Lynch et al. |
| 5,440,334 A | 8/1995 | Walters et al. |
| 5,442,390 A | 8/1995 | Hooper et al. |
| 5,452,006 A | 9/1995 | Auld |
| 5,475,498 A | 12/1995 | Radice |
| 5,475,656 A | 12/1995 | Sato et al. |
| 5,477,263 A | 12/1995 | O'Callaghan et al. |
| 5,479,056 A | 12/1995 | Mabuchi |
| 5,481,542 A | 1/1996 | Logston et al. |
| 5,485,611 A | 1/1996 | Astle |
| 5,486,687 A | 1/1996 | Le Roux |
| 5,488,409 A | 1/1996 | Yuen et al. |
| 5,488,433 A | 1/1996 | Washino et al. |
| 5,497,277 A | 3/1996 | Takahashi |
| 5,506,615 A | 4/1996 | Awaji |
| 5,506,902 A | 4/1996 | Kubota |
| 5,508,940 A | 4/1996 | Rossmere et al. |
| 5,510,858 A | 4/1996 | Shido et al. |
| 5,513,011 A | 4/1996 | Matsumoto et al. |
| 5,513,306 A | 4/1996 | Mills et al. |
| 5,519,684 A | 5/1996 | Iizuka et al. |
| 5,521,630 A | 5/1996 | Chen et al. |
| 5,528,281 A | 6/1996 | Grady et al. |
| 5,528,282 A | 6/1996 | Voeten et al. |
| 5,535,008 A | 7/1996 | Yamagishi |
| 5,535,137 A | 7/1996 | Rossmere et al. |
| 5,537,157 A | 7/1996 | Washino et al. |
| 5,546,250 A | 8/1996 | Diel |
| 5,550,594 A | 8/1996 | Cooper et al. |
| 5,550,982 A | 8/1996 | Long et al. |
| 5,583,561 A | 8/1996 | Baker et al. |
| 5,557,724 A | 9/1996 | Sampat et al. |
| 5,559,999 A | 9/1996 | Maturi et al. |
| 5,563,714 A | 10/1996 | Inoue et al. |
| 5,572,261 A | 11/1996 | Cooper |
| 5,572,442 A | 11/1996 | Schulhof et al. |
| 5,574,662 A | 11/1996 | Windrem et al. |
| 5,577,190 A | 11/1996 | Peters |
| 5,555,463 A | 12/1996 | Staron |
| 5,581,479 A | 12/1996 | McLaughlin et al. |
| 5,583,652 A | 12/1996 | Ware |
| 5,584,043 A | 12/1996 | Burkart |
| 5,586,264 A | 12/1996 | Belknap et al. |
| 5,590,195 A | 12/1996 | Ryan |
| 5,596,581 A | 1/1997 | Saeijs et al. |
| 5,598,352 A | 1/1997 | Rosenau et al. |
| 5,600,364 A | 2/1997 | Hendricks et al. |
| 5,603,058 A | 2/1997 | Belknap et al. |
| 5,604,544 A | 2/1997 | Bertram |
| 5,612,749 A | 3/1997 | Bacher et al. |
| 5,614,940 A | 3/1997 | Cobbley et al. |
| 5,619,247 A | 4/1997 | Russo |
| 5,619,337 A | 4/1997 | Naimpally |

(56) References Cited

U.S. PATENT DOCUMENTS

| | | |
|---|---|---|
| 5,625,464 A | 4/1997 | Compoint et al. |
| 5,629,732 A | 5/1997 | Moskowitz et al. |
| 5,642,171 A | 6/1997 | Baumgartner |
| 5,648,824 A | 7/1997 | Dunn et al. |
| 5,659,539 A | 8/1997 | Porter et al. |
| 5,659,653 A | 8/1997 | Diehl et al. |
| 5,635,984 A | 9/1997 | Lee |
| 5,664,044 A | 9/1997 | Ware |
| 5,668,948 A | 9/1997 | Belknap et al. |
| 5,675,388 A | 10/1997 | Cooper |
| 5,677,979 A | 10/1997 | Squicciarini et al. |
| 5,696,866 A | 12/1997 | Iggulden et al. |
| 5,696,868 A | 12/1997 | Kim et al. |
| 5,701,383 A | 12/1997 | Russo et al. |
| 5,703,655 A | 12/1997 | Corey et al. |
| 5,706,388 A | 1/1998 | Isaka |
| 5,712,976 A | 1/1998 | Falcon, Jr. et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottensen et al. |
| 5,721,933 A | 2/1998 | Walsh et al. |
| 5,724,474 A | 3/1998 | Oguro et al. |
| 5,729,516 A | 3/1998 | Tozaki et al. |
| 5,729,741 A | 3/1998 | Liaguno et al. |
| 5,751,282 A | 5/1998 | Girard et al. |
| 5,751,338 A | 5/1998 | Ludwig et al. |
| 5,751,371 A | 5/1998 | Shintani |
| 5,751,806 A | 5/1998 | Ryan |
| 5,751,883 A | 5/1998 | Ottensen et al. |
| 5,754,254 A | 5/1998 | Kobayashi et al. |
| 5,761,166 A | 6/1998 | Sedimayr et al. |
| 5,761,372 A | 6/1998 | Yoshinobu et al. |
| 5,761,417 A | 6/1998 | Henley et al. |
| 5,767,913 A | 6/1998 | Kassatly |
| 5,771,334 A | 6/1998 | Yamauchi et al. |
| 5,774,170 A | 6/1998 | Hite et al. |
| 5,774,186 A | 6/1998 | Brodsky et al. |
| 5,778,137 A | 7/1998 | Nielsen et al. |
| 5,787,225 A | 7/1998 | Honjo |
| 5,796,695 A | 8/1998 | Tsutsui |
| 5,805,763 A | 9/1998 | Lawler et al. |
| 5,805,804 A | 9/1998 | Laursen et al. |
| 5,805,821 A | 9/1998 | Saxena et al. |
| 5,808,607 A | 9/1998 | Brady et al. |
| 5,815,671 A | 9/1998 | Morrison |
| 5,815,689 A | 9/1998 | Shaw et al. |
| 5,822,493 A | 10/1998 | Uehara et al. |
| 5,828,848 A | 10/1998 | MacCormack et al. |
| 5,832,085 A | 11/1998 | Inoue et al. |
| 5,852,705 A | 12/1998 | Hanko et al. |
| 5,856,930 A | 1/1999 | Hosono |
| 5,862,342 A | 1/1999 | Winter et al. |
| 5,864,582 A | 1/1999 | Ander et al. |
| 5,864,682 A | 1/1999 | Porter et al. |
| 5,870,553 A | 2/1999 | Shaw et al. |
| 5,870,710 A | 2/1999 | Ozawa et al. |
| 5,889,915 A | 3/1999 | Hewton |
| 5,892,884 A | 4/1999 | Sugiyama et al. |
| 5,898,695 A | 4/1999 | Fujii et al. |
| 5,899,578 A | 5/1999 | Yanagihara et al. |
| 5,909,257 A | 6/1999 | Ohishi et al. |
| 5,911,030 A | 6/1999 | Kikuchi et al. |
| 5,914,941 A | 6/1999 | Janky |
| 5,920,572 A | 7/1999 | Washington et al. |
| 5,920,842 A | 7/1999 | Cooper et al. |
| 5,928,347 A | 7/1999 | Jones |
| 5,930,444 A | 7/1999 | Camhi et al. |
| 5,930,493 A | 7/1999 | Otteson et al. |
| 5,937,138 A | 8/1999 | Fukuda et al. |
| 5,940,074 A | 8/1999 | Britt, Jr. et al. |
| 5,949,948 A | 9/1999 | Krause et al. |
| 5,949,954 A | 9/1999 | Young et al. |
| 5,956,716 A | 9/1999 | Kenner et al. |
| 5,963,202 A | 10/1999 | Polish |
| 5,973,679 A | 10/1999 | Abbott et al. |
| 5,990,881 A | 11/1999 | Inou et al. |
| 5,991,496 A | 11/1999 | Kojitma |
| 5,995,709 A | 11/1999 | Tsuge |
| 5,999,691 A | 12/1999 | Takagi et al. |
| 5,999,698 A | 12/1999 | Nakai et al. |
| 6,002,832 A | 12/1999 | Yoneda |
| 6,005,562 A | 12/1999 | Shiga et al. |
| 6,005,564 A | 12/1999 | Ahmad et al. |
| 6,018,612 A | 1/2000 | Thomason et al. |
| 6,028,599 A | 2/2000 | Yuen et al. |
| 6,028,774 A | 2/2000 | Shin et al. |
| 6,094,234 A | 7/2000 | Nonomura et al. |
| RE36,801 E | 8/2000 | Logan et al. |
| 6,112,226 A | 8/2000 | Weaver et al. |
| 6,137,710 A | 10/2000 | Iwasaki et al. |
| 6,138,147 A | 10/2000 | Weaver et al. |
| 6,141,385 A | 10/2000 | Yamaji et al. |
| 6,148,140 A * | 11/2000 | Okada et al. ............... 386/241 |
| 6,151,059 A | 11/2000 | Schein et al. |
| 6,154,771 A | 11/2000 | Rangan et al. |
| 6,163,644 A | 12/2000 | Owashi et al. |
| 6,163,646 A | 12/2000 | Tanaka et al. |
| 6,167,083 A | 12/2000 | Sporer et al. |
| 6,169,843 B1 | 1/2001 | Lenihan et al. |
| 6,172,605 B1 | 1/2001 | Matsumoto et al. |
| 6,172,712 B1 | 1/2001 | Beard |
| 6,181,706 B1 | 1/2001 | Anderson et al. |
| 6,192,189 B1 | 2/2001 | Fujinami et al. |
| 6,198,877 B1 | 3/2001 | Kawamura et al. |
| 6,209,041 B1 | 3/2001 | Shaw et al. |
| 6,233,389 B1 | 4/2001 | Barton et al. |
| 6,226,447 B1 | 5/2001 | Sasaki et al. |
| 6,229,532 B1 | 5/2001 | Fujii |
| 6,243,741 B1 | 6/2001 | Utsumi |
| 6,249,641 B1 | 6/2001 | Yokota |
| 6,253,375 B1 | 6/2001 | Gordon et al. |
| 6,256,704 B1 | 7/2001 | Hlava et al. |
| 6,263,396 B1 | 7/2001 | Cottle et al. |
| 6,272,672 B1 | 8/2001 | Conway |
| 6,278,837 B1 | 8/2001 | Yasukohchi et al. |
| 6,282,209 B1 | 8/2001 | Kataoka et al. |
| 6,282,320 B1 | 8/2001 | Hasegawa et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,298,016 B1 | 10/2001 | Otsuka |
| 6,301,711 B1 | 10/2001 | Nusbickel |
| 6,304,714 B1 | 10/2001 | Krause et al. |
| 6,317,885 B1 | 11/2001 | Fries |
| 6,327,418 B1 | 12/2001 | Barton |
| 6,330,334 B1 | 12/2001 | Ryan |
| 6,330,675 B1 | 12/2001 | Wiser et al. |
| 6,332,175 B1 | 12/2001 | Birrell et al. |
| 6,341,195 B1 | 1/2002 | Mankovitz et al. |
| 6,343,179 B1 | 1/2002 | Suito et al. |
| 6,359,636 B1 | 3/2002 | Schindler et al. |
| 6,360,320 B1 | 3/2002 | Ishiguro et al. |
| 6,363,212 B1 | 3/2002 | Fujinami et al. |
| 6,353,461 B1 | 4/2002 | Shore et al. |
| 6,356,708 B1 | 4/2002 | Krause et al. |
| 6,400,407 B1 | 6/2002 | Zigmond et al. |
| 6,424,791 B1 | 7/2002 | Saib |
| 6,445,738 B1 | 9/2002 | Zdepski et al. |
| 6,445,872 B1 | 9/2002 | Sano et al. |
| RE37,881 E | 10/2002 | Haines |
| 6,477,123 B1 | 11/2002 | Hutter |
| 6,480,353 B1 | 11/2002 | Sacks et al. |
| 6,480,667 B1 | 11/2002 | O'Connor |
| 6,490,000 B1 | 12/2002 | Schaefer et al. |
| 6,496,647 B2 | 12/2002 | Arai et al. |
| 6,498,894 B2 | 12/2002 | Ito et al. |
| 6,504,990 B1 | 1/2003 | Abecassis |
| 6,516,467 B1 | 2/2003 | Schindler |
| 6,529,685 B2 | 3/2003 | Ottesen et al. |
| 6,535,008 B1 | 3/2003 | Casale |
| 6,535,465 B1 | 3/2003 | Shigetomi et al. |
| 6,542,695 B1 | 4/2003 | Akiba et al. |
| 6,546,556 B1 | 4/2003 | Kataoka et al. |

(56) References Cited

U.S. PATENT DOCUMENTS

| | | |
|---|---|---|
| 6,553,178 B2 | 4/2003 | Abecassis |
| 6,567,127 B1 | 5/2003 | Orr et al. |
| 6,694,200 B1 | 2/2004 | Naim |
| 6,697,944 B1 | 2/2004 | Jones et al. |
| 6,698,020 B1 | 2/2004 | Zigmond et al. |
| 6,704,493 B1 | 3/2004 | Matthews et al. |
| 6,708,251 B1 | 3/2004 | Boyle et al. |
| 6,748,539 B1 | 6/2004 | Lotspiech |
| 6,754,254 B2 | 6/2004 | Sendonaris |
| 6,757,165 B2 | 6/2004 | Fujiki et al. |
| 6,766,956 B1 | 7/2004 | Boylan et al. |
| 6,788,882 B1 | 9/2004 | Geer et al. |
| 6,829,254 B1 | 12/2004 | Rajahalme et al. |
| 6,865,431 B1 | 3/2005 | Hirota et al. |
| 6,895,169 B1 | 5/2005 | Sprague |
| 6,925,246 B1 | 8/2005 | Behl |
| 6,950,941 B1 | 9/2005 | Lee et al. |
| 6,959,221 B1 | 10/2005 | Kataoka |
| 6,985,584 B1 | 1/2006 | Yokota et al. |
| 6,993,567 B1 | 1/2006 | Yodo et al. |
| 7,032,177 B2 * | 4/2006 | Novak et al. .................. 715/723 |
| 7,050,705 B1 | 5/2006 | Mori |
| 7,055,166 B1 | 5/2006 | Logan et al. |
| 7,137,011 B1 | 11/2006 | Harari et al. |
| 7,239,800 B2 | 7/2007 | Bilbrey |
| 7,266,704 B2 | 9/2007 | Levy |
| 7,272,298 B1 | 9/2007 | Lang et al. |
| 7,346,582 B2 | 3/2008 | Sako et al. |
| 7,529,465 B2 | 5/2009 | Barton et al. |
| 7,607,157 B1 | 10/2009 | Inoue et al. |
| 7,877,765 B2 | 1/2011 | Bhogal et al. |
| 8,526,781 B2 | 9/2013 | Barton et al. |
| 2001/0003554 A1 | 6/2001 | Mori et al. |
| 2001/0013120 A1 | 8/2001 | Tsukamoto |
| 2001/0016884 A1 | 8/2001 | Sato et al. |
| 2002/0003949 A1 | 1/2002 | Mamiya et al. |
| 2002/0012531 A1 | 1/2002 | Flannery |
| 2002/0017558 A1 | 2/2002 | Graves |
| 2002/0028063 A1 | 3/2002 | Haneda et al. |
| 2002/0056118 A1 | 5/2002 | Hunter et al. |
| 2002/0057895 A1 | 5/2002 | Oku et al. |
| 2002/0144265 A1 | 10/2002 | Connelly |
| 2002/0164156 A1 | 11/2002 | Bilbrey |
| 2002/0176690 A1 * | 11/2002 | Nagasawa ...................... 386/52 |
| 2002/0199043 A1 | 12/2002 | Yin |
| 2003/0026589 A1 | 2/2003 | Barton et al. |
| 2003/0040962 A1 | 2/2003 | Lewis |
| 2003/0118014 A1 | 6/2003 | Iyer et al. |
| 2003/0120942 A1 | 6/2003 | Yoshida et al. |
| 2003/0174549 A1 | 9/2003 | Yaguchi et al. |
| 2003/0215211 A1 | 11/2003 | Coffin, III |
| 2004/0117483 A1 | 6/2004 | Singer et al. |
| 2004/0193900 A1 | 9/2004 | Nair |
| 2005/0025469 A1 | 2/2005 | Geer et al. |
| 2005/0066362 A1 | 3/2005 | Rambo |
| 2005/0122335 A1 | 6/2005 | MacInnis et al. |
| 2005/0132418 A1 | 6/2005 | Barton et al. |
| 2005/0226604 A1 | 10/2005 | Kawamura et al. |
| 2006/0045470 A1 * | 3/2006 | Poslinski et al. .............. 386/68 |
| 2007/0157237 A1 | 7/2007 | Cordray et al. |
| 2007/0166001 A1 | 7/2007 | Barton |
| 2007/0230921 A1 | 10/2007 | Barton et al. |
| 2008/0092168 A1 | 4/2008 | Logan et al. |
| 2008/0288998 A1 | 11/2008 | Locket |
| 2009/0136215 A1 | 5/2009 | Barton et al. |
| 2009/0208185 A1 | 8/2009 | Barton |
| 2009/0269024 A1 | 10/2009 | Locket et al. |
| 2010/0080529 A1 | 4/2010 | Barton et al. |
| 2010/0226627 A1 | 9/2010 | Barton et al. |
| 2011/0041146 A1 | 2/2011 | Lewis |
| 2011/0126107 A1 | 5/2011 | Barton et al. |
| 2014/0003791 A1 | 1/2014 | Barton et al. |
| 2014/0016912 A1 | 1/2014 | Lockett |
| 2014/0056572 A1 | 2/2014 | Barton et al. |

FOREIGN PATENT DOCUMENTS

| | | |
|---|---|---|
| DE | 3909334 A1 | 9/1990 |
| DE | 4201 031 C2 | 7/1993 |
| DE | 44 34 034 A1 | 3/1996 |
| EP | 594241 A1 | 10/1993 |
| EP | 0594241 | 4/1994 |
| EP | 594241 B1 | 4/1994 |
| EP | 0 651 328 A1 | 5/1995 |
| EP | 0701371 A1 | 3/1996 |
| EP | 0726574 A2 | 8/1996 |
| EP | 0766476 A2 | 9/1996 |
| EP | 97/0785675 A2 | 1/1997 |
| EP | 785675 A2 | 1/1997 |
| EP | 0762756 A2 | 3/1997 |
| EP | 784400 | 7/1997 |
| EP | 0817483 A2 | 1/1998 |
| GB | 2222742 A | 8/1989 |
| GB | 2 286 282 A | 8/1995 |
| GB | 2320637 | 6/1998 |
| GB | 2333017 | 7/1999 |
| JP | 61-133089 | 6/1986 |
| JP | 02-266774 | 10/1990 |
| JP | 3-34685 | 2/1991 |
| JP | 03-34685 | 2/1991 |
| JP | 04088772 | 3/1992 |
| JP | 5-181803 | 7/1993 |
| JP | 06233234 | 8/1994 |
| JP | 06245157 | 9/1994 |
| JP | H6-245182 | 9/1994 |
| JP | 07264529 | 1/1995 |
| JP | H7-30839 | 1/1995 |
| JP | 7-44907 | 2/1995 |
| JP | H7-44907 | 2/1995 |
| JP | 07111629 | 4/1995 |
| JP | 07131754 | 5/1995 |
| JP | 07250305 | 9/1995 |
| JP | 8-279273 | 10/1996 |
| JP | H8-289240 | 11/1996 |
| JP | 09233415 | 5/1997 |
| JP | 10-56620 | 2/1998 |
| JP | 11-203135 | 7/1999 |
| JP | 2000-295560 | 10/2000 |
| WO | WO 91/03112 A1 | 8/1990 |
| WO | 92/04573 | 6/1992 |
| WO | WO 92/22983 | 6/1992 |
| WO | WO 92/22983 A2 | 12/1992 |
| WO | WO 93/16557 A1 | 8/1993 |
| WO | WO 94/17626 | 8/1994 |
| WO | WO 95/33336 | 12/1995 |
| WO | WO 97/15143 | 4/1997 |
| WO | WO 98/48566 | 10/1998 |
| WO | WO 98/56188 | 12/1998 |
| WO | WO 99/38321 | 7/1999 |
| WO | WO 2000/76130 A1 | 5/2000 |
| WO | WO 00/33568 A1 | 6/2000 |
| WO | WO 01/48755 | 7/2001 |
| WO | WO 01/53963 | 7/2001 |
| WO | WO 03/19932 | 3/2003 |

OTHER PUBLICATIONS

Ex Parte Reexamination Certificate, U.S. Pat. No. 6,233,389, C1, issued Nov. 11, 2008.

Order Granting Request for Ex Parte Reexamination, U.S. Pat. No. 6,233,389, Control No. 90/009,329, dated Jan. 7, 2009.

Peuker, Thomas, "An Object-Oriented Architecture for the Real-Time Transmission of Multimedia Data Streams", Institute für Mathematische Maschinen and Datenverarbeitung (Informatik) IV, Lehrstul für Betriebssyteme Universität Erlangen-Nürnberg, Erlangen, Mar. 17, 1997.

Mayer-Patel, Ketan et al., "Synchronized Continuous Media Playback Through the World Wide Web", U.C. Berkeley, Computer Science Division, Berkeley Multimedia Research Center, Published:1996, Berkeley, CA.

Chatterjee, Amit et al., "Microsoft DirectShow: A New Media Architecture", SMPTE Journal, pp. 865-871, Dec. 1997.

(56) References Cited

OTHER PUBLICATIONS

Fung, Chi-Leung et al., "MOCS: an Object-Oriented Programming Model for Multimedia Object Communication and Synchronization", Department of Computer Science, The Hong Kong University of Science and Technology, Clear Water Bay, Kowloon, Hong Kong, 1994 IEEE.
Gibbs, Simon, "Composite Multimedia and Active Objects", Centre Universitaire dInformatique, Université de Genève, Proc. OOPSLA '91.
European Patent Office, Communication dated Feb. 5, 2009, in European Patent Application No. 1 729 515, Notice of Opposition, Brunner/Williamson opponents.
European Patent Office, Notice of Opposition, European Application No. EP 1 729 515, Interressensgemeinschaft fur Rundfunkschutzrechte e.V., opponent, dated Jan. 23, 2009.
Inside MacIntosh "QuickTime", Apple Technology Library by Apple Computer, Inc., © 1993 (published by Addison-Wesley Publishing Company) 719 pgs.
Inside MacIntosh "Files", Apple Technology Library by Apple Computer, Inc., © 1992 (published by Addison-Wesley Publishing Company) 532 pgs.
Inside MacIntosh "Memory", Apple Technology Library by Apple Computer, Inc., © 1992 (published by Addison-Wesley Publishing Company) 303 pgs.
Inside MacIntosh "QuickTime Components", Apple Technology Library by Apple Computer, Inc., © 1993 (published by Addison-Wesley Publishing Company) 828 pgs.
Inside MacIntosh "Overview", Apple Technology Library by Apple Computer, Inc., © 1992 (published by Addison-Wesley Publishing Company) 251 pgs.
Quantum Q500 Series High Capacity 5 1/4" Fixed Disk Drive, Quantum Corporation, © 1983 (2 pgs).
Quantum Q2080 Low-Cost, 85 Megabyte Fixed Disk Drive, "85 Mb capacity/40ms average access time", Quantum Corporation, © 1982 (2 pgs).
OEM Interface Specifications for DSAA-3xxx, 3.5-Inch Hard Disk Drive with ATA Interface, IBM Corporation, © 1994 (65 pgs).
International Standard ISO/IEC 11172-2:1993(E), (Part 2: Video), Downloaded Jun. 15, 2005 (136 pgs).
International Standard ISO/IEC 11171-3:1993/Cor.1:1996(E), (Part 3: Audio), Downloaded Jun. 15, 2005 (159 pgs).
Hewlett Packard® MPEGscope User's Guide, Hewlett Packard Company © 1997-2000 (282 pgs).
DiviCom, MP100 User Guide, DiviCom, Inc., © 1996 (97 pgs).
Hewlett Packard® MPEGscope Startup Guide, Hewlett Packard Company © 1997-2000 (39 pgs).
Media Stream, "Satellite Receiver" Installation and Users Guide for Windows 95, Media4, Inc., © 1996 (33 pgs).
International Standard ISO/IEC 13818-1:2000(E) "Information Technology—Generic Coding of Moving Pictures and Associated Audio Information: Systems", © ISO/IEC 2000, Downloaded Jun. 30, 2005 (173 pgs).
International Standard ISO/IEC 13818-1:2000/Amd.2:2004(E) "Information Technology—Generic Coding of Moving Pictures and Associated Audio Information: Systems", Amendment 2: Support of IPMP on MPEG-2 Systems, © ISO/IEC 2004, Downloaded Jun. 30, 2005 (13 pgs).
International Standard ISO/IEC 13818-2:2000(E) "Information Technology—Generic Coding of Moving Pictures and Associated Audio Information: Video", © ISO/IEC 2000, Downloaded Jun. 30, 2005 (219 pgs).
International Standard ISO/IEC 13818-3:1998(E) "Information Technology—Generic Coding of Moving Pictures and Associated Audio Information: Audio", © ISO/IEC 1998 (125 pgs).
Vin, Harrick M., et al., *Designing a Multiuser HDTV Storage Server*, IEEE Journal, vol. 11, No. 1, Jan. 1993 (pp. 153-164).
Hodge, Winston, et al., "*Chapter 7, True Video on Demand vs. Near Video on Demand*", delivered at National Cable Television Conference, May 24, 1994 (pp. 103-120).

Orji, Cyril U. et al., "*Design and Configuration Rationales for Digital Video Storage and Delivery Systems*", Multimedia Tools and Applications, 9, 275-302 (1992), © 1992 Kluwer Academic Publishers, Boston (pp. 275-302).
Johnston, R. , et al., "*A Digital Television Sequence Store*", IEEE, (pp. 594-600) © 1978.
Hausdorfer M., "*Symposium Record Broadcast Sessions*", HDTV Production: Today and Tomorrow, Jun. 17, 1989, (7 pgs).
Berson, S., "*Computer Science Department Technical Report*", Staggered Striping in Multimedia Information System, Dec. 1993, Apr. 29, 1994, (24 pgs).
Conner Filepro Performance Series, CFP1060E/CFP1060S/CFP1060W, "*Intelligent Disk Drive Product Manual*", Rev. A, May 1994, © 1994, Conner Peripherals, Inc., (79 pgs).
Sierra, Hugh M. , "*An Introduction to Direct Access Storage Devices*", © 1990 by Academic Press, Inc., (269 pgs).
Anderson, Douglas T., "*The Hard Disk Technical Guide*", Tenth Revision S-D., Feb. 1994, © 1990, 1991, 1992, 1993, 1994 by Micro House International Inc., (70 pgs).
Official Action from CN for foreign patent application No. 02816471.1 dated Oct. 21, 2005 (5 pgs)—attached.
Office Action from CN for foreign patent application No. 200410056388.3 dated Nov. 25, 2005 (15 pgs)—attached.
Official Action from EPO for foreign patent application No. 99 909 867.6-2202 dated Dec. 27, 2005 (5 pgs).
Smollar, S. et al., *Content-based Video Indexing and Retrieval*, IEEE, Summer 1994, pp. 62-72.
Meng, J. et al., *CVEPS-A Compressed Video Editing and Parsing System*, ACM Multimedia '96, Boston MA, pp. 43-53 (ACM 0-89791-671-1/96/1).
Zhang, H. et al., *Video Parsing Retrieval and Browsing: An Integrated and Content-Based Solution*, ACM Multimedia 95-Electronic Proceedings (Nov. 5-9, 1995, San Francisco, CA).
Guide to VAX/VMS File Applications Software Version VAX/VMS Version 4.0, Sep. 1984 (19 pgs).
Ramanathan et al., "Toward personalized multimedia dial-up services, Computer Networks and ISDN Systems" Jul. 26, 1994, No. 10, Amsterdam NL.
Fuji et al., "Implementation of MPEG Transport Demultiplexer with a RISC-Based Microcontroller", IEEE, 1996.
Macweek News article entitled "Quick Time Ready for Prime Time", dated Dec. 10, 1991 (2 pages).
Hewlett Packard Laboratories Technical Report entitled "UNIX Disk Access Patterns", by Chris Ruemmler and John Wildes, HPL-92-152, dated Dec. 1992 (pp. 405-420), Hewlett-Packard Company, 1992.
J.M.Harker Et Al., "A Quarter Century of Disk File Innovation," IBM J. Res. Develop., vol. 25, No. 5, Sep. 1981, pp. 677-690.
A.D. Hospodor, "The Effect of Prefetch in SCSA Disk Drive Cache Buffers," Doctoral Thesis, Santa Clara University, May 2, 1994.
D.J. Woodham, "HDTV Production: Today and Tomorrow: A Solid State "Action Relay" Recorder", Symposium Record Broadcast Sessions, System Session P-2, dated Jun. 17, 1989 (8 pgs.).
European Patent Office, Application No. 02796373.5-1522, Office Action dated Jan. 25, 2008.
European Patent Office, Application No. 02796373.5-1522, Office Action dated Jan. 15, 2007.
Japanese Application 2003524253, Office Action dated Oct. 19, 2005.
European Application No. 06019602.9, Office Action dated Jan. 10, 2007.
European Application No. 06019602.9, Search Report dated Nov. 6, 2006.
U.S. District Court for the Eastern District of Texas, Marshall Division, Amended Final Judgment and Permanent Injunction, *Tivo Inc.* v. *Echostar Communications Corp. et al.*, Case No. 2:04-CV-1-DF, Jun. 2, 2009.
U.S. District Court for the Eastern District of Texas, Marshall Division, Memorandum Opinion, *Tivo Inc.* v. *Echostar Communications Corp. et al.*, Case No. 2:04-CV-1-DF, Jun. 2, 2009.
Petition of Patent Owner to Vacate Order Granting Second Reexamination Request, U.S. Pat. No. 6,233,389, Control No. 90/009,329, filed May 27, 2009.

(56) References Cited

OTHER PUBLICATIONS

Petition of Patent Owner to Temporarily Suspend Ex Parte Reexamination Proceeding, U.S. Pat. No. 6,233,389, Control No. 90/009,329, filed May 27, 2009.
Decision on Petition of Patent Owner to Temporarily Suspend Ex Parte Reexamination Proceeding, U.S. Pat. No. 6,233,389, Control No. 90/009,329, dated Sep. 14, 2009.
Non-final Office Action in Reexamination Proceeding, U.S. Pat. No. 6,233,389, Control No. 90/009,329, dated Aug. 3, 2009.
Decision on Petition of Patent Owner to Temporarily Suspend Ex Parte Reexamination Proceeding, U.S. Pat. No. 6,233,389, Control No. 90/009,329, dated Aug. 21, 2009.
"New Graphics Enhancements Will Be on Display at NAB (National Association of Broadcasters) Exhibition", Broadcasting v118, n11, p. 57, Mar. 12, 1990.
"Next Video Recorder—Tape or Disc?", Consumer Electronics, v33, n8, Feb. 22, 1993.
McLarnon, Zed et al., "Digital Image Meets Digital Audio; Sync Problems Faced by Multimedia Producer Now", Advanced Imaging, v9, n1, p. 62, Jan. 1994.
Nelson, Lee J. "The Latest in Compression Hardware & Software (Product Survey)", Advanced Imaging, v9, n1, p. 56, Jan. 1995.
Leek, Matthew R., et al., "MPEG Q&A (Moving Pictures Expert Group Digital Video Compression Standard")", CD-ROM Professional, v7, n4, p. 41, Jul.-Aug. 1994.
Hanjalic et al., "Automation of systems enabling search on stored video data," SPIE/IS&T Electronic Imaging '97, vol. 3022, pp. 427-438, Jan. 15, 1997.
DMA, published in Embedded Systems Programming, 4 pages, Oct. 1994.
European Patent Office, Application No. 07025136.8-1522, Office Action dated Mar. 30, 2009.
European Patent Office, Application No. 07025136.8-1522, current claims as of Mar. 30, 2009.
U.S. District Court for the Eastern District of Texas, Marshall Division, Claim Construction Order, *Tivo Inc.* v. *Echostar Communications Corp. et al.*, Case No. 2:04-CV-1-DF, Aug. 18, 2005.
U.S. District Court for the Eastern District of Texas, Marshall Division, Final Judgment and Permanent Injunction, *Tivo Inc.* v. *Echostar Communications Corp. et al.*, Case No. 2:04-CV-1-DF, Aug. 17, 2006.
U.S. Court of Appeals for the Federal Circuit, *TiVo Inc.* v. *Echostar Communications Corp. et al.*, Decision, Case No. 2006-1574, Decided: Jan. 31, 2008.
Quantum Fireball 640/1280S Product Manual, Quantum® Copyright© 1995 by Quantum Corporation.
U.S. Patent and Trademark Office, "Ex Parte Reexamination Communication Transmittal Form: Notice of Intent to Issue Reexamination Certificate", Reexamination Control No. 90/007,750, dated Nov. 28, 2007.
U.S. District Court for the Eastern District of Texas, Marshall Division, Complaint for Patent Infringement and Jury Demand, *Tivo Inc.* v. *AT&T Inc.*, Case No. 2:09-cv-259, Aug. 26, 2009.
U.S. District Court for the Eastern District of Texas, Marshall Division, Complaint for Patent Infringement and Jury Demand, *Tivo Inc.* v. *Verizon Communications, Inc.*, Case No. 2:09-cv-257, Aug. 26, 2009.
U.S. Appl. No. 10/190,256, filed Jul. 5, 2005, Office Action, dated Feb. 23, 2010.
U.S. Appl. No. 10/481,646, filed Apr. 18, 2003, Office Action, dated Feb. 2, 2010.
Intellectual Property Library, "Sitrick vs. Dreamworks LLC", (CAFC) 85 USPQ2d, 1826, revised Feb. 5, 2008, 9 pages.
Office Action received in European application No. 11182065.0 dated Dec. 16, 2011 (9 pages).
Current Claims of European application No. 11182065.0 dated Dec. 2011 (3 pages).
U.S. District Court for the Eastern District of Texas, Marshall Division, Tivo's and Verizon Communications Inc., Verizon Service Corp. and Verizon Corporation Resources Group LLC Invalidity Contentions, *TiVo Inc.* vs. *Verizon Communications Inc.* Case No. 2:09-CV-257-DF, 44 pages.
Exhibit A1 to AT&T's and Microsoft Corporation's Invalidity Contentions: Claim Chart of U.S. Pat. No. 6,233,389 in view of U.S. Pat. No. 5,557,724 to Sampat, 23 pages.
Exhibit A2 to AT&T's and Microsoft Corporation's Invalidity Contentions: Claim Chart of U.S. Pat. No. 6,233,389 in view of U.S. Pat. No. 6,169,843, 6 pages.
Exhibit A3 to AT&T's and Microsoft Corporation's Invalidity Contentions: Claim Chart of U.S. Pat. No. 6,233,389 in view of U.S. Pat. No. 6,181,706, 5 pages.
Exhibit A4 to AT&T's and Microsoft Corporation's Invalidity Contentions: Claim Chart of U.S. Pat. No. 6,233,389 in view of U.S. Pat. No. 7,272,298 to Lang, 11 pages.
Exhibit A5 to AT&T's and Microsoft Corporation's Invalidity Contentions: Claim Chart of U.S. Pat. No. 6,233,389 in view of U.S. Pat. No. 6,209,041, 140 pages.
Exhibit A6 to AT&T's and Microsoft Corporation's Invalidity Contentions: Claim Chart of U.S. Pat. No. 6,233,389 in view of U.S. Pat. No. 6,172,712, 137 pages.
Exhibit A7 to AT&T's and Microsoft Corporation's Invalidity Contentions: Claim Chart of U.S. Pat. No. 6,233,389 in view of Graham Thomason, EP0594241, 136 pages.
Exhibit A8 to AT&T's and Microsoft Corporation's Invalidity Contentions: Claim Chart of U.S. Pat. No. 6,233,389 in view of U.S. Pat. No. 5,822,493, 161 pages.
Exhibit A9 to AT&T's and Microsoft Corporation's Invalidity Contentions: Claim Chart of U.S. Pat. No. 6,233,389 in view of U.S. Pat. No. 6,490,000, 134 pages.
Exhibit A10 to AT&T's and Microsoft Corporation's Invalidity Contentions: Claim Chart of U.S. Pat. No. 6,233,389 in view of C. Hanna et al., Demultiplexer IC for MPEG2 Transport Streams, 138 pages.
Exhibit A11 to AT&T's and Microsoft Corporation's Invalidity Contentions: Claim Chart of U.S. Pat. No. 6,233,389 in view of Robert Johnson, A Digital Television Sequence Store, 148 pages.
Exhibit A12 to AT&T's and Microsoft Corporation's Invalidity Contentions: Claim Chart of U.S. Pat. No. 6,233,389 in view of U.S. Pat. No. 5,721,815 to Ottesen, 18 pages.
Exhibit A13 to AT&T's and Microsoft Corporation's Invalidity Contentions: Claim Chart of U.S. Pat. No. 6,233,389 in view of U.S. Pat. No. 6,018,612 to Thomason, et al. and further in view of U.S. Pat. No. 5,949,948 to Krause et al., 7 pages.
Exhibit A14 to AT&T's and Microsoft Corporation's Invalidity Contentions: Claim Chart of U.S. Pat. No. 6,233,389 in view of U.S. Pat. No. 6,018,612, and further in view of U.S. Pat. No. 5,477,263 and U.S. Pat. No. 6,169,843, 11 pages.
Exhibit A15 to AT&T's and Microsoft Corporation's Invalidity Contentions: Claim Chart of U.S. Pat. No. 6,233,389 in view of "StreamObjects: Dynamically-Segmented Scalable Media Over the Internet" by Steven Niemczyk, 17 pages.
Exhibit A16 to AT&T's and Microsoft Corporation's Invalidity Contentions: Claim Chart of U.S. Pat. No. 6,233,389 in view of "A Programming System for the Dynamic Manipulation of Temporally Sensitive Data" by Christopher J. Lindblad, 16 pages.
Exhibit A17 to AT&T's and Microsoft Corporation's Invalidity Contentions: Claim Chart of U.S. Pat. No. 6,233,389 in view of "An Architecture for Networked Multimedia" by Jonathan C. Soo, 12 pages.
Exhibit A18 to AT&T's and Microsoft Corporation's Invalidity Contentions: Claim Chart of U.S. Pat. No. 6,233,389 in view of "Design of a Storage and Retrieval Model for Multimedia Data" by Ruihong Wang, 11 pages.
Exhibit A19 to AT&T's and Microsoft Corporation's Invalidity Contentions: Claim Chart of U.S. Pat. No. 6,233,389 in view of U.S. Pat. No. 6,304,714 to Krause et al., 7 pages.
Exhibit A20 to AT&T's and Microsoft Corporation's Invalidity Contentions: Claim Chart of U.S. Pat. No. 6,233,389 in view of U.S. Pat. No. 5,990,881, 6 pages.
Exhibit A21 to AT&T's and Microsoft Corporation's Invalidity Contentions: Claim Chart of U.S. Pat. No. 6,233,389 in view of U.S. Pat. No. 5,898,695, 6 pages.

(56) References Cited

OTHER PUBLICATIONS

Exhibit A22 to AT&T's and Microsoft Corporation's Invalidity Contentions: Claim Chart of U.S. Pat. No. 6,233,389 in view of "Developing Object-Oriented Multimedia Software" by Phillip Ackermann, 9 pages.
Exhibit A23 to AT&T's and Microsoft Corporation's Invalidity Contentions: Claim Chart of U.S. Pat. No. 6,233,389 in view of U.S. DISHplayer 7100 System and U.S. Pat. No. 6,490,000, 21 pages.
U.S. District Court for the Eastern District of Texas, Marshall Division, AT&T's and Microsoft Corporation's Invalidity Contentions, *TiVo Inc.* vs. *AT&T Inc. and Microsoft Corporation*, Case No. 2:09-CV-259-DF, 44 pages, May 21, 2010.
Ash, Robert "Real-Time Encoding and Feeds in Oracle Video Server" an Oracle white paper, Mar. 1998, 7 pages.
Dowden, John et al. "Oracle Video Server: Getting Started with Oracle Video Server Manager" release 3.0, Feb. 1998, part No. A55979-02, 48 pages.
Hanna, C. et al. "Demultiplexer IC for MPEG2 Transport Streams" IEEE Transactions on Consumer Electronics, vol. 41, No. 3, Aug. 1995, pp. 699-706.
Kurioka, Tatsuya et al. "Television Homer Server for Integrated Services—Toward the Realization of ISDB 'Anytime' Services-" NHK Science and Technical Research Laboratories, Tokyo, Japan, Proceedings ISCE '97, IEEE International Symposium on consumer Electronics, pp. 250-253.
Lindblad, Christopher "A Programming System for the Dynamic Manipulation of Temporally Sensitive Data" MIT Laboratory for Computer Science, Aug. 1994, 275 pages.
Linden, Brian et al. "Oracle Video Server™: Introducing Oracle Video Server" release 3.0, Feb. 1998, part No. A53956-02, 78 pages.
McKendrick, Martin "Adding Video to Applications with the Oracle Video Server" an Oracle White Paper, Mar. 1998, 30 pages.
Minneman, Scott L. et al. "Where Were We: making and using near-synchronous, pre-narrative video" International Multimedia Conference, Proceedings of the first ACM International Conference on Multimedia 1993, pp. 207-214, (9 pages).
Niemczyk, Steven "StreamObjects: Dynamically-Segmented Scalable Media Over the Internet" submitted to the Department of Electrical Engineering and Computer Science, Massachusetts Institute of Technology, May 27, 1996, 90 pages.
Oracle Corporation "Video-Enhanced Web Services: Delivering Interactive Television and Switched Video Broadcast Services" an Oracle, Digital, Ericsson and Acorn White Paper, Mar. 1998, 11 pages.
Soo, Jonathan C. "An Architecture for Networked Multimedia" submitted to the Department of Electrical Engineering and Computer Science, Massachusetts Institute of Technology, May 30, 1995, 49 pages.
Tektronix PDR 100 Profile Video Disk Recorder 070-9042-02, User Manual, First printing: Feb. 1995, Revised: Aug. 1995, 156 pages.
Wang, Ruihong "Design of a Storage and Retrieval Model for Multimedia Data" Thesis, submitted to the School of Graduate Studies and Research, Ottawa-Carleton Institute of Electrical Engineering, 1994, 116 pages.
Oracle Corporation "Oracle Video Server™: Installation Guide" Release 3.0 for Sun SPARC Solaris 2.x, Feb. 1998, part No. A59554-01, 82 pages.
Dowden, John et al. Oracle Video Server™: Quick Start, Release 3.0, Feb. 1998, part No. A53954-02, 28 pages.
Oracle Corporation "Oracle Video Server™: Release Notes" Realease 3.0.4 for Sun SPARC Solaris 2.x. May 1998, part No. A53951-03, 34 pages.

Rosen, Daryl "Oracle Video Server System Technical Overview" An Oracle White Paper, Mar. 1998, 15 pages.
Engst, Adam "Quick Time" article originally appeared in TidBITS on Jul. 22, 1991 at 12:00 p.m., the permanent URL for the article is: http://db.tidbits.com/article/3441, 5 pages.
Brophy, Karen A. "SuperMac's JPEG-based DigitalFilm card could change the multimedia game" article from Infoworld, Aug. 9, 1993, p. 68.
Pugh, Jon "VideoSpigot Review" article originally appeared in TidBITS on Apr. 20, 1992 at 12:00 p.m., the permanent URL for the article is: http://db.tidbits.com/article/3120, 3 pages.
Computergram "WebTV Networks Promises TV-Quality Video with VideoFlash", Jan. 20, 1997, article from www.cbronline.com, 1 page.
Coale, Kristi "WebTV Plus Raises the Stakes" Sep. 16, 1997, article URL is http://www.wired.com/print/science/discoveries/news/1997/09/6914, 2 pages.
Phillip Ackermann, excerpts including: the cover, pp. 66-69 and pp. 190-193 from the book entitled "Developing Object-Oriented Multimedia Software" copyright 1996 by dpunkt, 5 pages.
Loronix CCTVware Enterprise Product Brochure, 2 pages.
Loronix CCTVware Solo Product Brochure, 2 pages.
U.S. Appl. No. 10/418,646, filed Apr. 18, 2003, Office Action, dated Feb. 2, 2010.
U.S. Appl. No. 10/418,646, filed Apr. 18, 2003, Office Action, dated Oct. 14, 2010.
U.S. Appl. No. 10/418,646, filed Apr. 18, 2003, Office Action, dated Jun. 8, 2011.
U.S. Appl. No. 10/418,646, filed Apr. 18, 2003, Office Action, dated Sep. 13, 2011.
U.S. Appl. No. 11/725,909, filed Mar. 19, 2007, Office Action, dated Feb. 24, 2012.
U.S. Appl. No. 11/725,909, filed Mar. 19, 2007, Restriction Requirement, dated Feb. 24, 2012.
U.S. Appl. No. 10/190,256, filed Jul. 8, 2002, Ex parte Quayle Action, dated Mar. 13, 2012.
U.S. Appl. No. 11/051,347, filed Feb. 4, 2005, Office Action, dated Jul. 8, 2010.
Office Action received in European application No. 07025136.8-1522 dated Nov. 18, 2011 (5 pages).
Current Claims in Application No. 07025136.8-1522, dated Nov. 2011, 4 pages.
U.S. Appl. No. 12/783,298, filed May 19, 2010, Final Office Action, dated Apr. 4, 2013.
U.S. Appl. No. 12/270,852, filed Nov. 13, 2008, Office Action, dated Feb. 27, 2013.
Australian Government, "Patent Examination Report No. 1", in application No. 20100202449, dated Jun. 28, 2012, 3 pages.
Current Claims application No. 20100202449, dated Jun. 2012, 3 pages.
Chinese Office Action received in Application No. 200580041645.9 dated Nov. 24, 2011 (9 pages).
Current Claims of Chinese Application No. 200580041645.9 dated Nov. 2011 (11 pages).
U.S. Appl. No. 11/726,054, filed Mar. 20, 2007, Office Action, dated Mar. 22, 2012.
U.S. Appl. No. 12/430,024, filed Apr. 24, 2009, Office Action, dated Apr. 24, 2009.
U.S. Appl. No. 11/725,909, filed Mar. 19, 2007, Restriction Requirement, dated Nov. 10, 2011.
U.S. Appl. No. 10/418,646, filed Apr. 18, 2003, Final Office Action, dated Apr. 24, 2012.

\* cited by examiner

DIGITAL VIDEO RECORDER VIDEO EDITING SYSTEM

CROSS-REFERENCE TO RELATED APPLICATIONS; PRIORITY CLAIM

This application claims the benefit of Provisional Appln. 60/630,398, filed Nov. 19, 2004, the entire contents of which is hereby incorporated by reference as if fully set forth herein, under 35 U.S.C. § 119(e).

FIELD OF THE INVENTION

The present invention generally relates to the editing of digital video content stored on a digital video recorder.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

With the advent of digital video recorders (DVR) users have had more flexibility on how they record television programs. Before DVRs, users had to record television programs using a VCR. VCRs required that the user replenish the video tape in the VCR whenever the user wanted to save the programs recorded on the previous video tape.

DVRs on the other hand, do not require any changing of media by the user to operate. A DVR records television programs on a large capacity hard drive, allowing the user to record many hours of television programs. Whenever the hard drive gets full, the DVR deletes older programs to make room for newer programs.

One drawback to both VCRs and DVRs is that the entire television program is recorded. The fast-forward feature has been the user's favorite tool to skip over portions of the programs that the user is not interested in viewing. For example, users typically fast-forward through commercials because they prefer to have continuity for the program that they are watching and commercials are an interruption.

As DVR users archive programs on the DVR's hard drive, efficiently storing the programs becomes important as well as allowing users to customize their saved programs. DVRs do not have any editing capabilities to allow users to do these types of operations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A digital video recorder (DVR) video editing system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Description
    2.1 DVR Video Storage
    2.2 Video Editing User Interface and Operation
  3.0 Implementation Mechanisms—Hardware Overview
  4.0 Extensions and Alternatives 1.0 General Overview There is a clear need for a system that provides the user with the ability to combine and edit the content of programs to create custom multimedia content. Additionally, the system would give the user a user interface that allows the user to easily accomplish editing tasks and saving of edited content.

An embodiment of the invention provides a user interface and video editing environment that allows a user to edit program content stored on a DVR. A visual progress indicator is displayed over the program content that the user has selected to edit.

The user moves a position indicator within a cache bar in the visual progress indicator. The cache bar indicates how much of the program content has been stored on the DVR's storage device.

The user can delete sections of the program content by marking a beginning and ending point for the section within the cache bar. The user positions the position indicator to the desired beginning point and marks the point. The user then moves the position indicator to the desired ending point and selects the delete section option. Deleted sections are highlighted in the cache bar by a color that is different from the normal color used for the cache bar.

The user can also add other recorded program content into the program content by positioning the position indicator to the point where the user wants the other program content inserted. The user then selects the other recorded program content from a list of program content stored on the storage device. The added content is highlighted in the cache bar by a color that is different from the normal color used for the cache bar.

In other aspects, the invention encompasses a computer apparatus and a computer-readable medium configured to carry out the foregoing steps.

2.0 Structural and Functional Description 2.1 DVR Video Storage

Figure 1A:
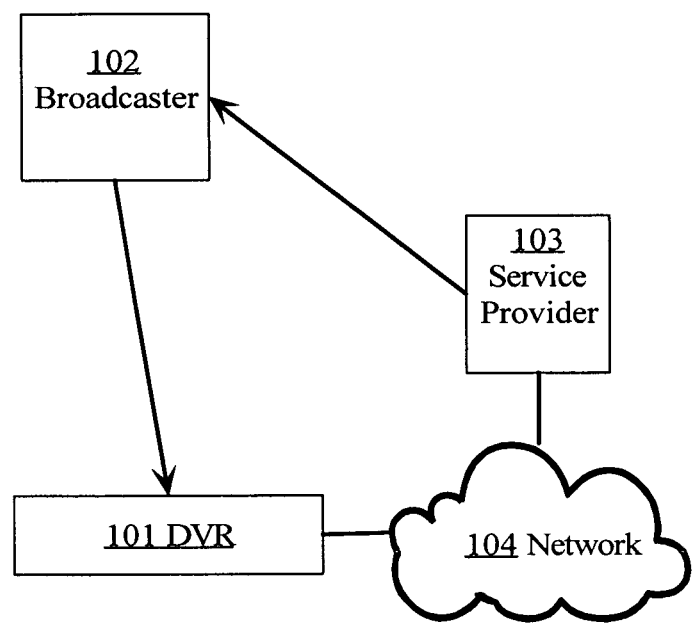
FIG. 1A is a block diagram illustrating a system including a service provider, digital video recorder (DVR), and a broadcaster according to an embodiment of the invention.

An embodiment of the invention provides a user interface and video editing system for a digital video recorder (DVR). Referring to FIG. 1A, typically, the DVR's main purpose is to record and display television program content. A user specifies television program content to record through an interface on the DVR 101. The functionality of a DVR is typified in U.S. Pat. No. 6,233,389 which is owned by the Applicant and is hereby incorporated by reference.

The DVR 101 schedules the recording of the program content using an electronic program guide (EPG) downloaded from a service provider 103. The service provider 103 assembles an EPG specifically for the user's cable, satellite, or terrestrial television service area and periodically transfers the EPG to the DVR 101.

At the appropriate time, the DVR 101 tunes to the channel that the broadcaster 102 of the desired program content is transmitting the program content on. The DVR 101 stores the recorded program content on a local storage device such as a hard drive, RAM, or other static memory device. In an alternative embodiment the DVR 101 displays content stored on an attached storage device, video device, PC, portable device, or remote storage system to the user.

An embodiment of the invention allows the user to edit program content stored on the storage device. The user has the ability to delete portions of the program content combine portions of program content and store the content on the local storage device. The DVR 101 may also have an integrated or attached recordable media device such as a DVD recorder. The user may copy the resulting edited program content to a recordable medium. A DVR with an integrated DVD recording device is described in U.S. patent application Ser. No. 10/418,646 which is owned by the Applicant and is hereby incorporated by reference.

Figure 1B:
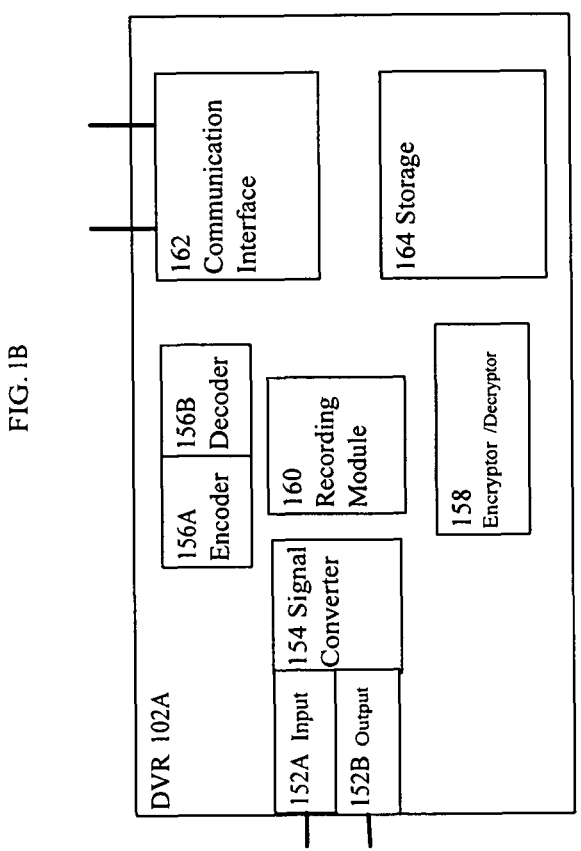
FIG. 1B is a block diagram illustrating a general overview of the components of a DVR according to an embodiment of the invention.

Referring to FIG. 1B, in an embodiment, DVR 101 generally comprises a plurality of components, signified by Signal Converter 154, that are necessary to digitize an analog television signal and convert it into a digital data stream or to accept a digital data stream. DVR 101 receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 101 may utilize a Digital Visual Interface port (DVI) for sending digital signals to a TV via a DVI cable.

DVR 101 also includes a Communication Interface 162, through which the DVR 101 communicates with Network 104 via Ethernet, wireless network, modem, or other communications standard. Further, DVR 101 may be integrated into a TV system such that the components described above are housed in a TV set capable of performing the functions of each component of DVR 101.

In another embodiment, DVR 101 generally comprises a plurality of components necessary to receive, record, store, transfer and playback digital data signals from a plurality of sources, such as a PC, a DVR, a service provider, or content server. DVR 101 can transfer digital data signals to another DVR or PC. DVR 101 may encode or decode digital signals via Encoder 156A and Decoder 156B into a plurality of formats for playback, storage or transfer. DVR 101 can also encrypt or decrypt digital data signals using Encryptor/Decryptor 158 for storage, transfer or playback of the digital data signals.

In one embodiment, DVR 101 communicates with Service Provider 103, which provides program guide data, graphical resources such as brand icons and pictures, service information, software programs, advertisements, and other forms of data that enable DVR 101 to operate independently of the Service Provider 103 to perform autonomous recording functions. Communication between DVR 101 and Service Provider 103 utilizes a secure distribution architecture to transfer data between the DVR 101 and the Service Provider 103 such that both the service data and the user's privacy are protected.

Figure 2:
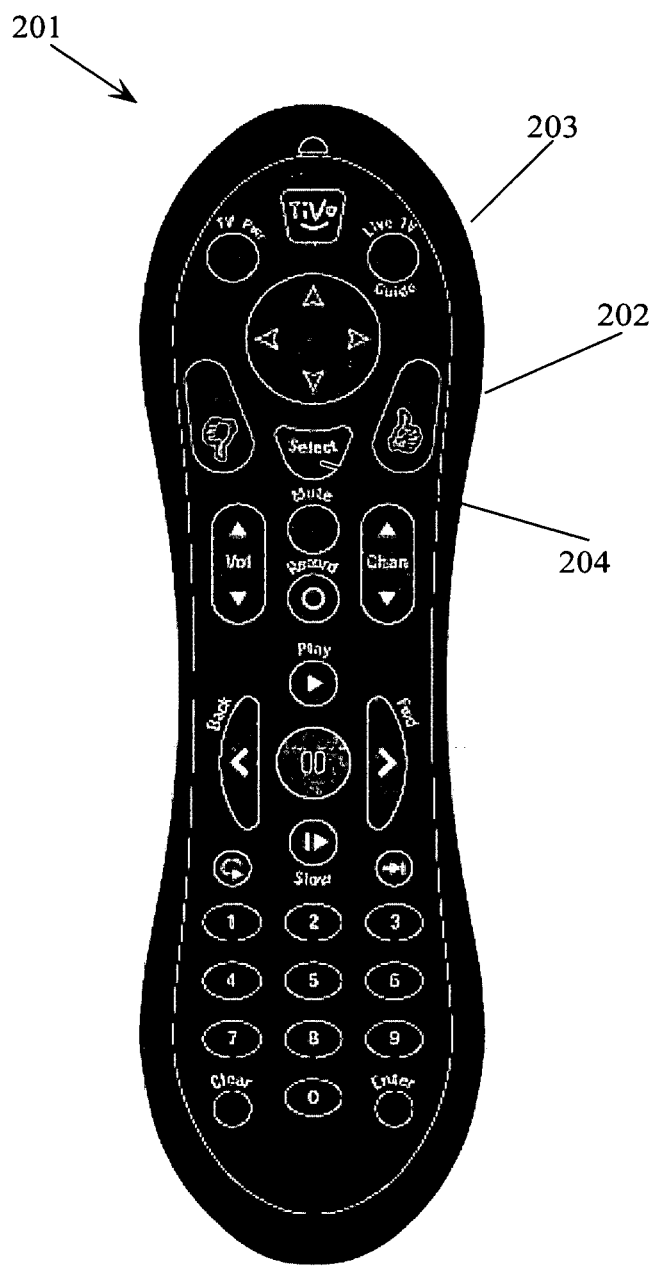
FIG. 2 illustrates a remote control used to communicate user commands according to an embodiment of the invention.
Figure 3:
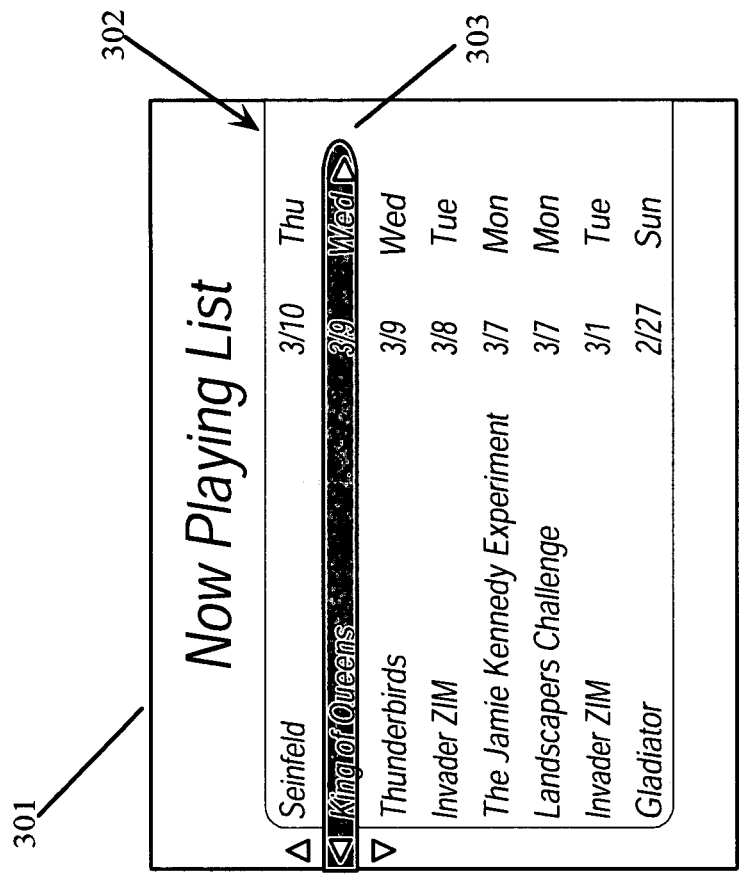
FIG. 3 is a screenshot of a menu is displayed to the user listing recorded program content stored on a storage device according to an embodiment of the invention.

DVR 101 provides a user interface (UI) that allows the user to browse through the recorded program content stored on the DVR's storage device. The user can also browse through content stored on attached devices such as a camcorder, PC, VCR; camera phone, PDA, or any other portable device. Referring to FIGS. 2 and 3 a menu 301 is displayed to the user listing recorded program content 302. The user selects a particular program content by highlighting the program name 303 and pressing a button on a remote control such as remote control 201. In this example, the user presses the select button 204 to have the program content information displayed.

Figure 4:
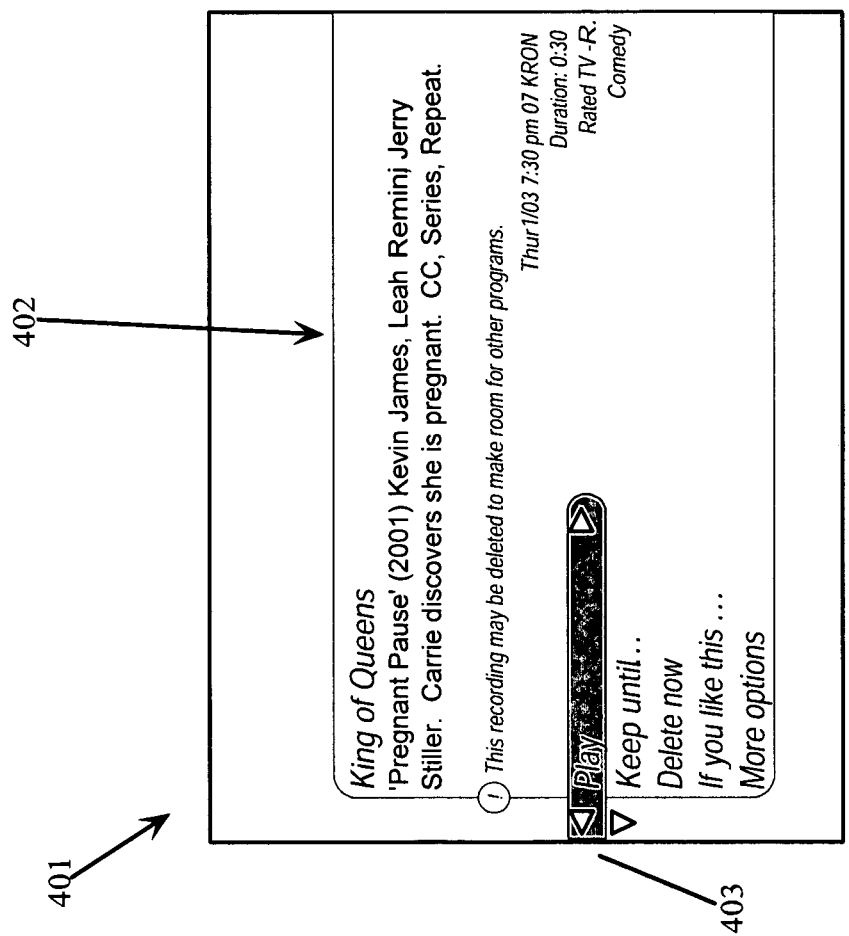
FIG. 4 is a screenshot of a menu that lists information for a selected program content according to an embodiment of the invention.
Figure 5:
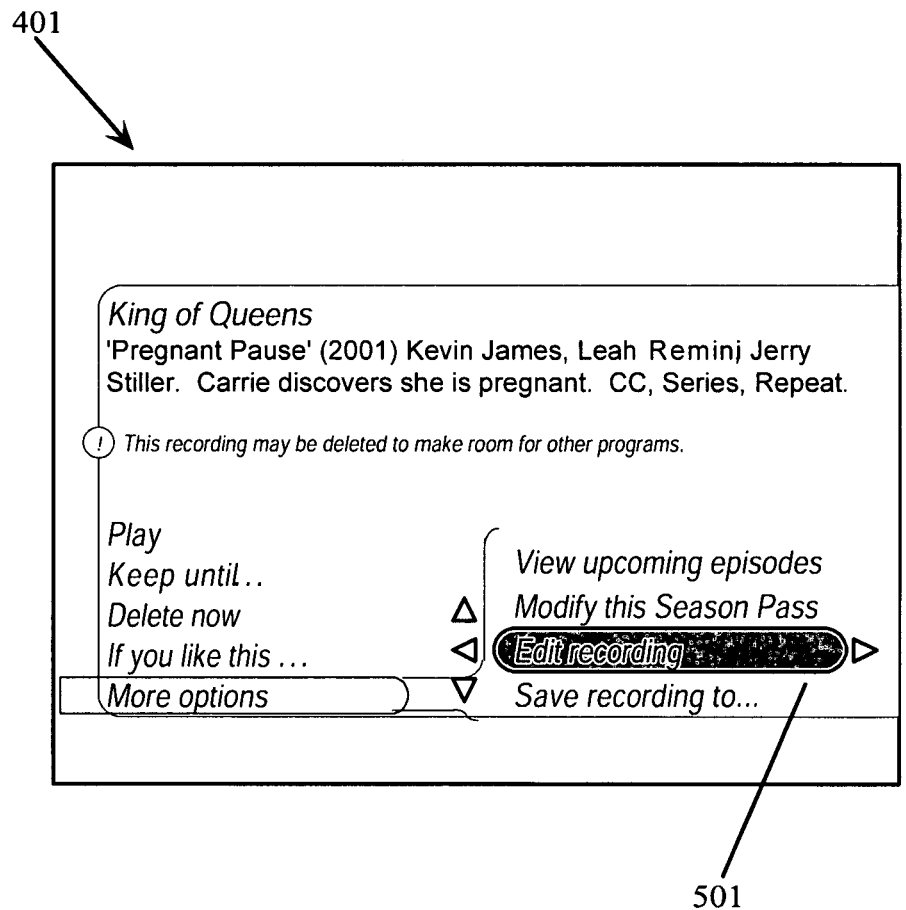
FIG. 5 is a screenshot of a menu that lists information for a selected program content and an editing option according to an embodiment of the invention.

FIGS. 4 and 5 show a screen shot of a menu 401 that lists information 402 for the selected program content. The user moves the highlight bar 403 down the menu to select options in the menu. The user scrolls down to the edit recording option 501.

Figure 6:
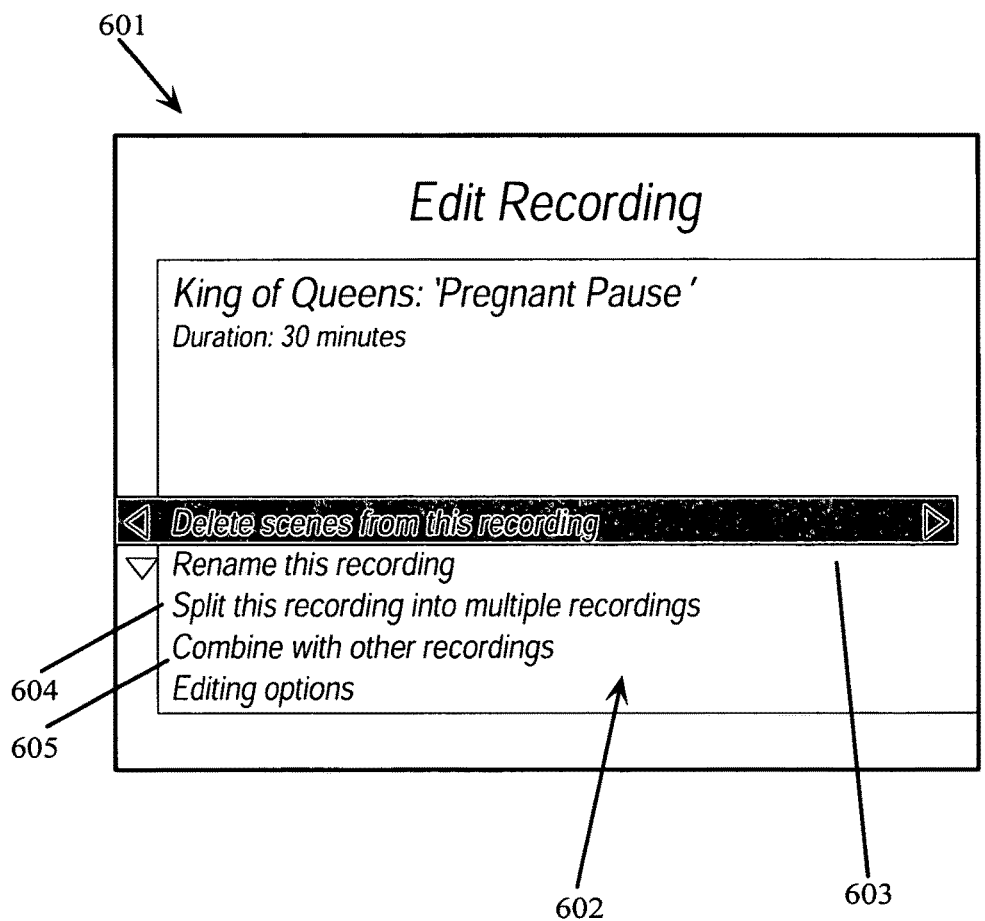
FIG. 6 is a screenshot of a video editing menu for a selected recording according to an embodiment of the invention.
Figure 7:
FIG. 7 is a screenshot of an informational menu appearing over recorded content to inform the user that he is in a delete scenes mode and how to perform deletions according to an embodiment of the invention.
Figure 8:
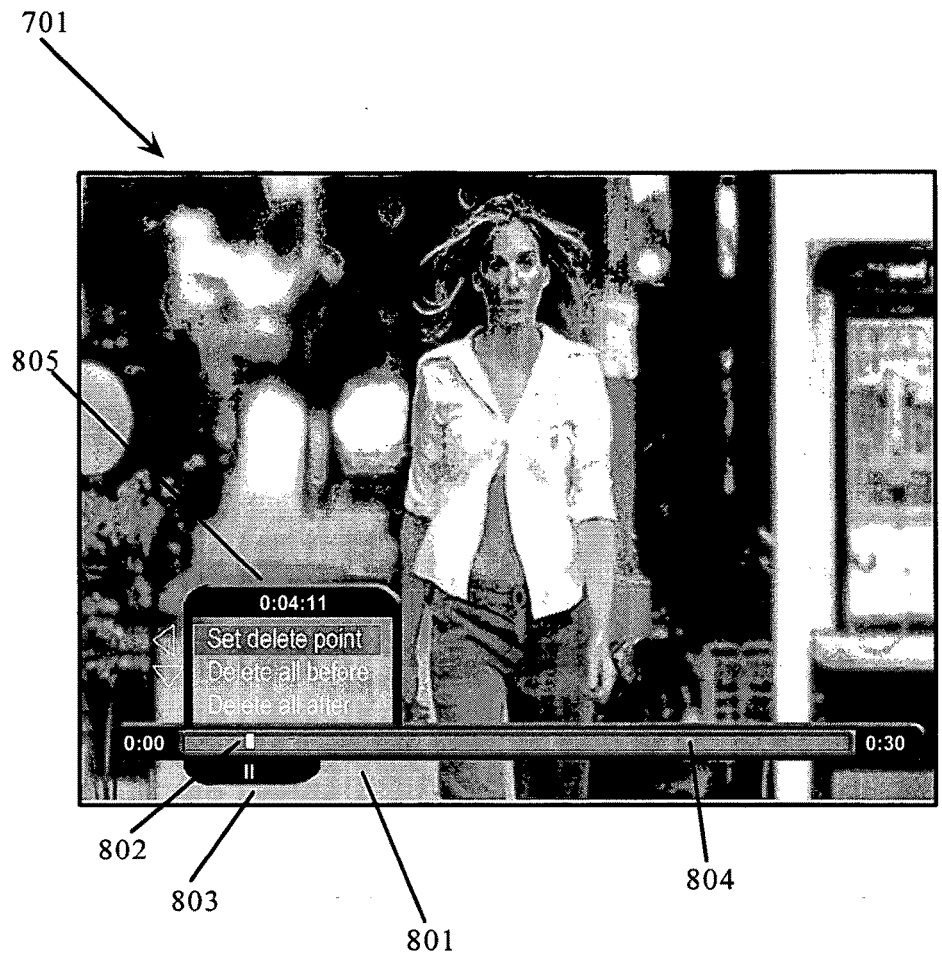
FIG. 8 is a screenshot of an editing mode with a visual progress indicator according to an embodiment of the invention.
Figure 9:
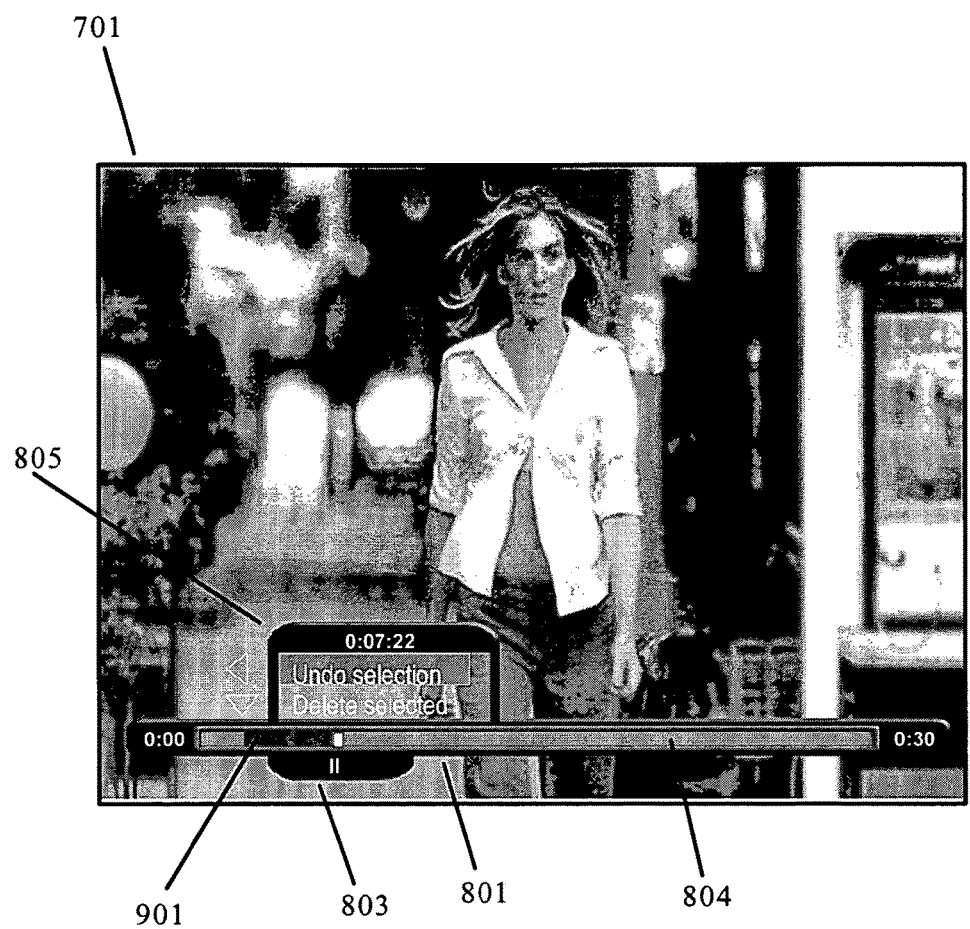
FIG. 9 is a screenshot of an editing mode with a visual progress indicator showing a selected section according to an embodiment of the invention.
Figure 10:
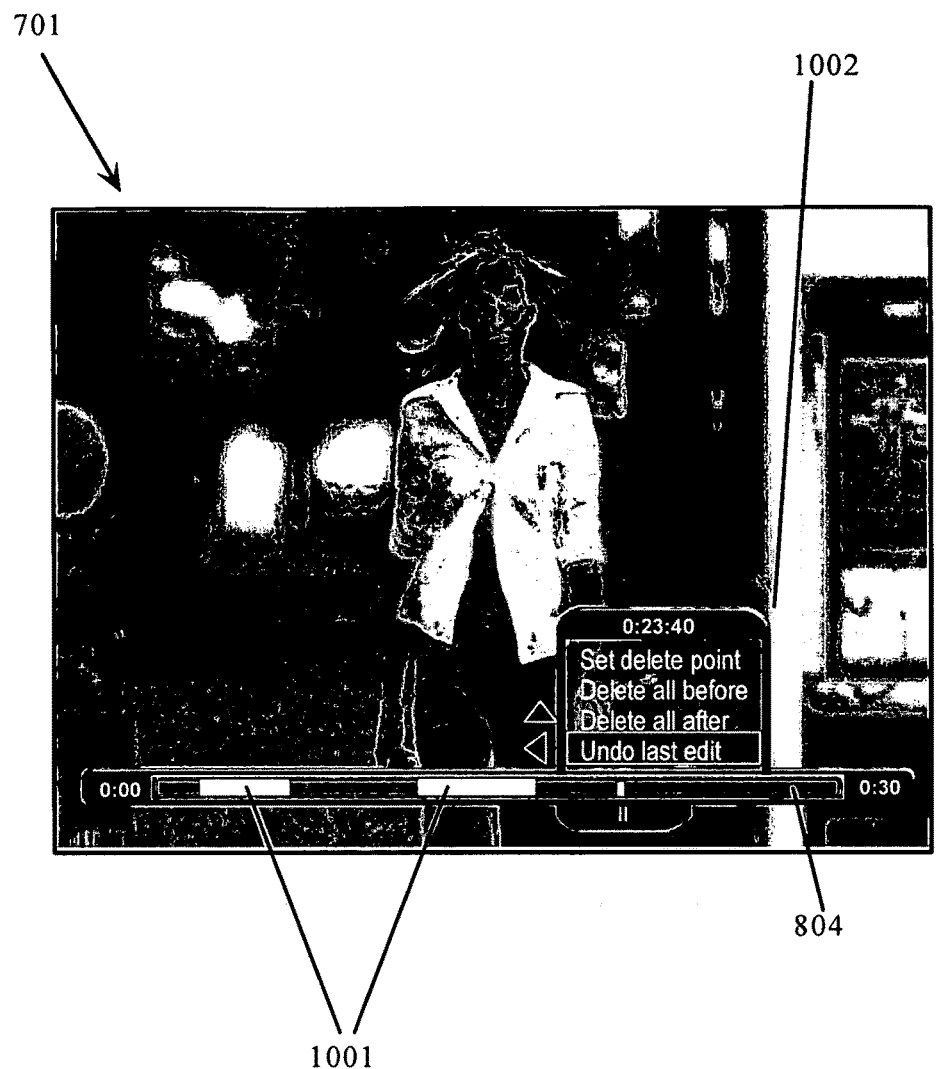
FIG. 10 is a screenshot of an editing mode with a visual progress indicator showing a deleted sections according to an embodiment of the invention.
Figure 11:
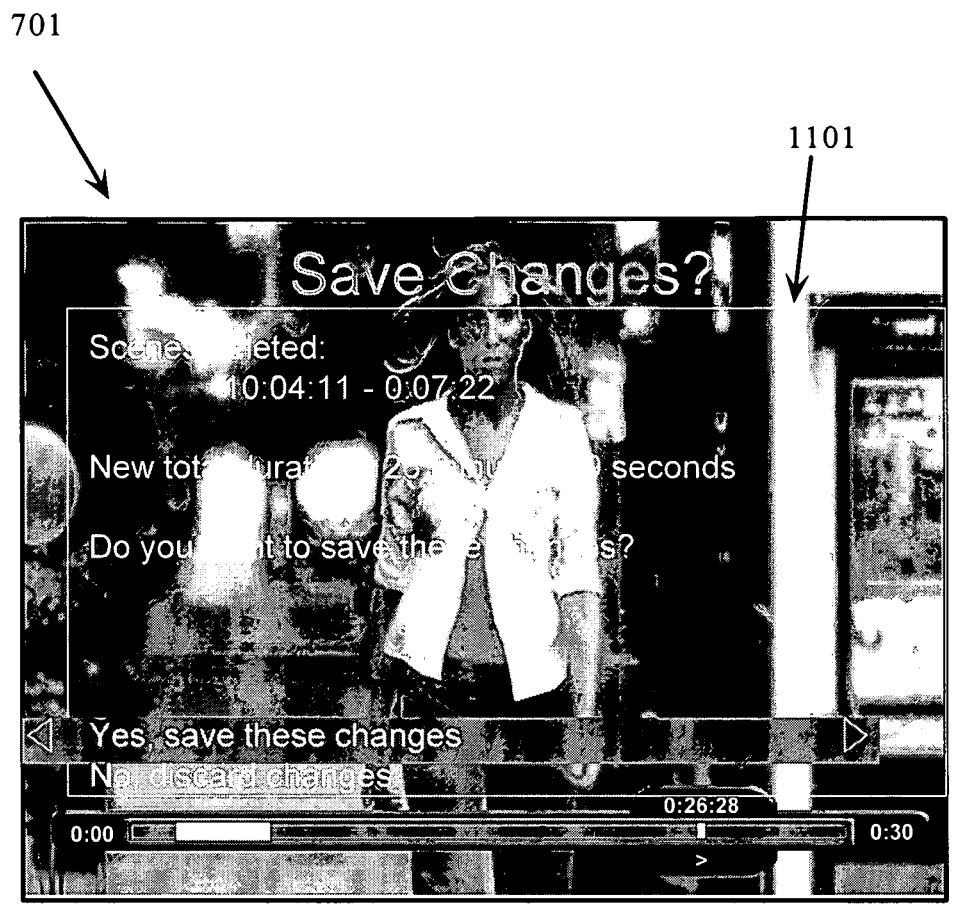
FIG. 11 is a screenshot of a menu that asks a user to save any edits or to discard any edits according to an embodiment of the invention.

FIG. 6 shows a video editing menu 601 for the selected recording. A list of editing options 602 is displayed to the user. For example, the user has the option to delete scenes from the recorded content 603, split the recording into multiple recordings 604, and combine with other recordings 605. In an embodiment, the user can also rename a recording via the video editing menu 601.

Referring to FIGS. 7-11, when the user selects the delete scenes from recording option 603, the program content appears 701. An informational menu 702 can appear to inform the user that he is in the delete scenes mode and how to perform deletions.

The user continues on to the editing mode. In the editing mode a visual progress indicator appears 801. The visual progress indicator tells the user where he is within the program content. A visual progress indicator is described in U.S. Pat. No. 6,850,691 which is owned by the Applicant and hereby incorporated by reference.

A cache bar 804 indicates how much of a recording has been stored. If a recording has been completely recorded, then the cache bar will be filled with a single color. If any portions of the recorded content are missing, then a clear section where the portion is missing appears. A position indicator 802 graphically informs the user where he is currently viewing from within the content. The position indicator moves forward or backward along the cache bar 804 as the user navigates within the content. The user can fast forward, reverse, or frame step through the content using the remote control 201. In an alternative embodiment, the user has the ability to drag the position indicator to any position within the cache bar and drop the position indicator where he wants it to be via the remote control. This allows the user to move within the cache bar much faster than fast forward or reverse modes.

A slider 803 follows along with the position indicator 802 as the position indicator 802 progresses through the content. The slider 803 can display the playback mode that the user is in, e.g., pause, play, fast forward, reverse, the speed of fast forward or reverse, or frame stepping. An editing pop up menu 805 can prompt the user when he presses a certain key on the remote control 201. The editing menu 805 allows the user to perform operations on the content for example, setting a delete point, deleting before the current position, or deleting after the current position. The editing menu 805 displays the current time position within the content of the position indicator 802.

If the user selects a starting delete point, then the user moves the slider 803 along the visual progress indicator 801 to the point where he wants to mark off the end of the selected portion. The selected section 901 appears as a different color from the normal color of the cache bar 804. The menu 805 then shows options that the user can perform on the selected section 901, for example, undo the selection or delete the selection.

When the user selects deleting before the current position or deleting after the current position, all of the content before or after the current point is highlighted in the cache bar 804 in a color different from the normal color of the cache bar 804.

Deleted sections 1001 appear in clear, for example, to create a contrast with the normal cache bar 804 color so the user comprehends visually what sections have been deleted. The user can always undo his last edit by selecting the undo edit option in the pop-up menu 1002. When the user has completed his edits, a menu 1101 is displayed that allows the user to save his edits or discard his edits.

The deleting sections option 603 allows a user to edit commercials from his content, remove any overlap from other program content, delete the sections around a clip that he wants to retain, or to remove scenes that he may feel are offensive or inappropriate for children, for example. It further provides the user the ability to make use of the memory on the storage device more efficient by deleting portions of the content that he has already watched. This releases memory back to the DVR so the DVR can use the free memory for other recordings.

When the user deletes sections from content, the DVR removes the sections from the content which compresses the content. The overall length of the content shortens as stored on the storage device. The DVR displays the new length of time for the content in the visual progress indicator when the user plays the content.

The interaction for the other editing options of splitting the recording into multiple recordings 604, and combining with other recordings 605 is similar to what has been described above.

The split the recording into multiple recordings option 604 allows the user to split a particular content into different content streams stored on the storage device. The user marks which sections are to be saved as another recording on the storage device. The section to be split is highlighted in a color that is different form the normal cache bar color. The DVR then saves the marked sections as new recordings on the storage device. The user can have the option of naming each of the new recordings or to let the DVR name each recording. The new recordings are listed on the recordings list when the user enters the recording listing menu 301. What remains of the original content is stored on the storage device under the original recording. Alternatively, the user can have the option of deleting the original recording when he is finished splitting desired sections out of the original recording.

When the user selects the combine with other recordings option 605, the DVR can allow the user to append the recording to the beginning, end, or other position within another recording. The user can also have the option to insert other recordings into the current recording. The user moves the position indicator to where he wants to insert the new section and selects from the pop-up menu 805 the insert recording option. The DVR displays a listing of recordings stored on the storage device and the user can scroll through the listing and select a recording. The selected recording is inserted into the recording at the point where the position indicator is placed. The new section is highlighted in a color that is different from the normal cache color and also different from the color used for deleted sections.

The combination of the split the recording into multiple recordings 604 and the combine with other recordings 605 options allows the user to combine sections of recordings to create his own custom recording. The user could split a section of a recording out of a number of recordings using the split the recording into multiple recordings option 604 and piece the sections together in any combination that he wants using the combine with other recordings option 605. The DVR places the sections into the designated recording at the position where the user has indicated. The user can then save the resultant recording after he reviews the combination using the visual progress indicator 801.

3.0 Implementation Mechanisms—Hardware Overview

Figure 12:
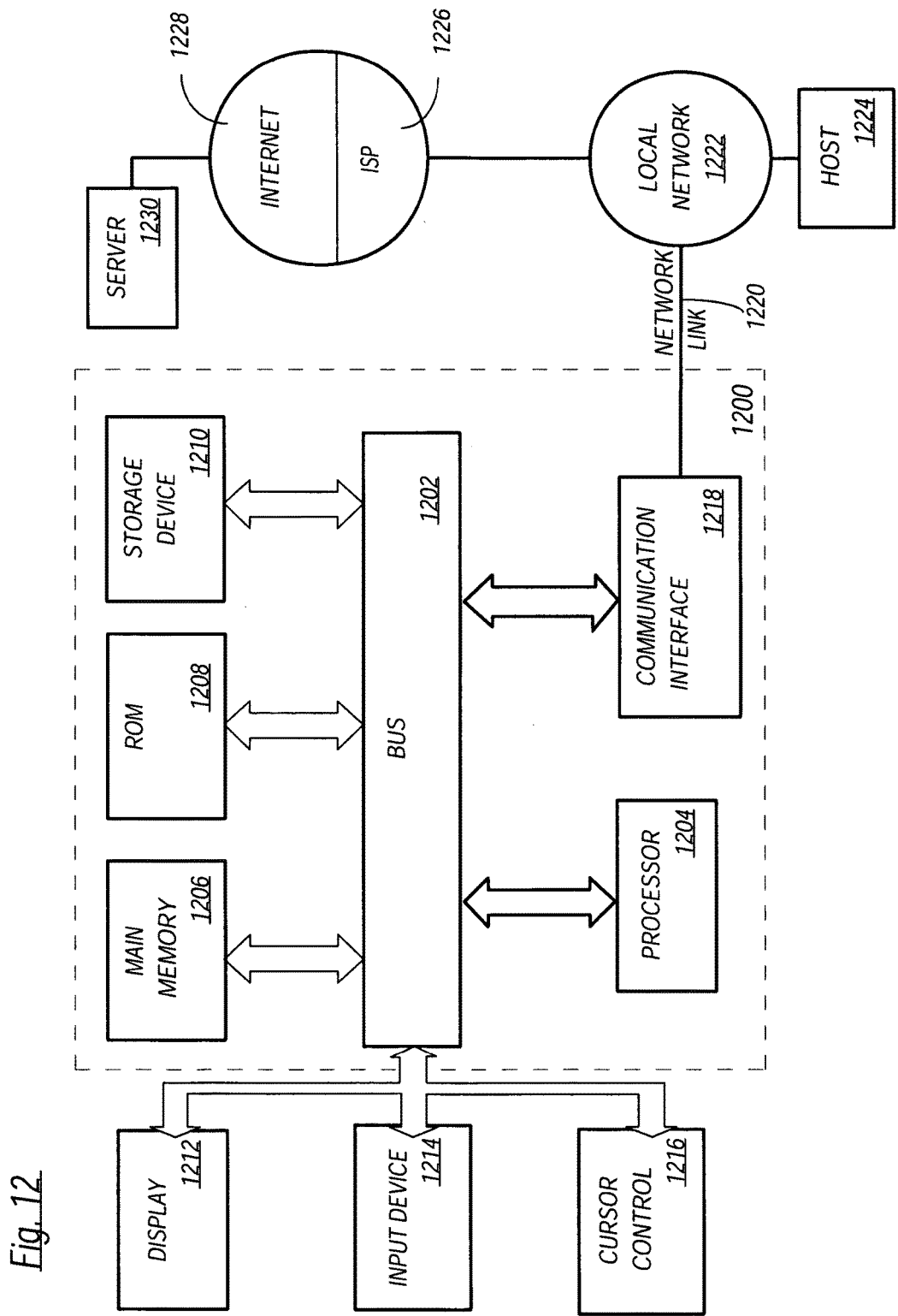
FIG. 12 is a block diagram that illustrates a computer system upon which an embodiment may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory ("RAM") or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory ("ROM") 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube ("CRT"), for displaying information to a computer user. An input device 1214, including alphanumeric and other keys, is coupled to bus 1202 for communicating information and command selections to processor 1204. Another type of user input device is cursor control 1216, such as a mouse, trackball, stylus, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for DVR video editing. According to one embodiment of the invention, a DVR video editing system is provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector can receive the data carried in the infrared signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network ("ISDN") card or a modem to provide a data communication connection to a corresponding type of telephone line. As another example, communication interface 1218 may be a local area network ("LAN") card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider ("ISP") 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application provides for controlling document access using centrally managed rules as described herein.

The received code may be executed by processor 1204 as it is received, and/or stored in storage device 1210, or other non-volatile storage for later execution. In this manner, computer system 1200 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for editing video content on a digital video recorder (DVR), comprising:

receiving a request from a user to edit a video content;

retrieving the video content from a storage device;

playing back the video content to the user;

displaying a cache bar to the user, the cache bar indicates the length of the video content, the cache bar is filled with a first color;

displaying a position indicator that moves within the cache bar and graphically indicates a current position within the length of the video content indicated by the cache bar;

in response to a first user command, moving the position indicator to a position along the cache bar;

displaying a time corresponding to the position of the position indicator in relation to the cache bar;

in response to a second user command, displaying a pop up menu in a vicinity of the cache bar, the menu comprising a list of selectable menu items;

in response to a third user command that indicates selecting selection of an item from the list of selectable menu items and prior to an end of playback of the video content:

marking a section of the video content which is less than an entirety of the video content, and saving the section of the video content as a new recording; and in response to a fourth user command selecting an item from the list of selectable menu items prior to the end of the playback of the video content, saving the section of the video content on the storage device, the section of the video content is then removed from the video content.

2. A method as recited in claim 1, wherein displaying the cache bar to the user further comprises highlighting deleted content sections on the cache bar with a second color.

3. A method as recited in claim 1, wherein displaying the cache bar to the user further comprises highlighting inserted content sections with a third color.

4. A method as recited in claim 1, wherein upon the user committing to saving any editing changes, any memory used on the storage device by any deleted content sections is released and used by the DVR.

5. A method as recited in claim 1, wherein the video content is shortened by an amount equal to any saved user-defined video content sections.

6. A method as recited in claim 1, wherein the user deletes a section of content from the video content by positioning the position indicator and designating a beginning and end of the section of content to be deleted.

7. A method as recited in claim 1, wherein, in response to the fourth user command, only the section of the video content that has been marked is removed from the video content.

8. An apparatus for editing video content on a digital video recorder (DVR), comprising:

a first subsystem that receives a request from a user to edit a video content;

a second subsystem that retrieves the video content from a storage device;

a third subsystem that plays back the video content to the user;

a cache bar display subsystem that displays a cache bar to the user, the cache bar indicates the length of the video content, wherein the cache bar is filled with a first color;

a fourth subsystem that displays a position indicator that moves within the cache bar and graphically indicates a current position within the length of the video content indicated by the cache bar;

a fifth subsystem that, in response to a first user command, moves the position indicator to a position along the cache bar;

a sixth subsystem that displays a time corresponding to the position of the position indicator in relation to the cache bar;

a seventh subsystem that, in response to a second user command, displays a pop up menu in a vicinity of the cache bar, the menu comprising a list of selectable menu items;

an eighth subsystem that, in response to a third user command that indicates selection of an item from the list of selectable menu items and prior to an end of playback of the video content:

marks a section of the video content which is less than an entirety of the video content, and saving the section of the video content as a new recording; and a ninth subsystem that, in response to a fourth user command selecting an item from the list of selectable menu items prior to the end of the playback of the video content, saves the section of the video content on the storage device, the section of the video content is then removed from the video content.

9. An apparatus as recited in claim 8, wherein the cache bar display subsystem highlights deleted content sections on the cache bar with a second color.

10. An apparatus as recited in claim 8, wherein the cache bar display subsystem highlights inserted content sections with a third color.

11. An apparatus as recited in claim 8, wherein upon the user committing to saving any editing changes, any memory used on the storage device by any deleted content sections is released and used by the DVR.

12. An apparatus as recited in claim 8, wherein the video content is shortened by an amount equal to any saved user-defined video content sections.

13. An apparatus as recited in claim 8, wherein the user deletes a section of content from the video content by positioning the position indicator and designating a beginning and end of the section of content to be deleted.

14. An apparatus as recited in claim 8, wherein, in response to the fourth user command, only the section of the video content that has been marked is removed from the video content.

15. A non-transitory computer-readable medium carrying one or more sequences of instructions for editing video content on a digital video recorder (DVR), which instructions, when executed by one or more processors, cause the one or more processors to carry out the steps of:

receiving a request from a user to edit a video content;

retrieving the video content from a storage device;

playing back the video content to the user;

displaying a cache bar to the user, the cache bar indicates the length of the video content, the cache bar is filled with a first color;

displaying a position indicator that moves within the cache bar and graphically indicates a current position within the length of the video content indicated by the cache bar;

in response to a first user command, moving the position indicator to a position along the cache bar;

displaying a time corresponding to the position of the position indicator in relation to the cache bar;

in response to a second user command, displaying a pop up menu in a vicinity of the cache bar, the menu comprising a list of selectable menu items;

in response to a third user command that indicates selection of an item from the list of selectable menu items and prior to an end of playback of the video content:

marking a section of the video content which is less than an entirety of the video content, and saving the section of the video content as a new recording; and in response to a fourth user command selecting an item from the list of selectable menu items prior to the end of the playback of the video content, saving the section of the video content on the storage device, the section of the video content is then removed from the video content.

16. A non-transitory computer-readable medium as recited in claim 15, wherein displaying the cache bar to the user further comprises highlighting deleted content sections on the cache bar with a second color.

17. A non-transitory computer-readable medium as recited in claim 15, wherein displaying the cache bar to the user further comprises highlighting inserted content sections with a third color.

18. A non-transitory computer-readable medium as recited in claim 15, wherein upon the user committing to saving any editing changes, any memory used on the storage device by any deleted content sections is released and used by the DVR.

19. A non-transitory computer-readable medium as recited in claim 15, wherein the video content is shortened by an amount equal to any saved user-defined video content sections.

20. A non-transitory computer-readable medium as recited in claim 15, wherein the user deletes a section of content from the video content by positioning the position indicator and designating a beginning and end of the section of content to be deleted.

21. A non-transitory computer-readable medium as recited in claim 15, wherein, in response to the fourth user command, only the section of the video content that has been marked is removed from the video content.

* * * * *